(12) United States Patent
Moulthrop, Jr. et al.

(10) Patent No.: US 6,383,361 B1
(45) Date of Patent: May 7, 2002

(54) FLUIDS MANAGEMENT SYSTEM FOR WATER ELECTROLYSIS

(75) Inventors: Lawrence C. Moulthrop, Jr., Windsor; Trent M. Molter; Robert J. Friedland, both of Enfield, all of CT (US)

(73) Assignee: Proton Energy Systems, Rocky Hill, CT (US)

( * ) Notice: Subject to any disclaimer, the term of this patent is extended or adjusted under 35 U.S.C. 154(b) by 0 days.

(21) Appl. No.: 09/712,353

(22) Filed: Nov. 14, 2000

Related U.S. Application Data

(63) Continuation of application No. 09/224,046, filed on Dec. 31, 1998, now abandoned, which is a continuation-in-part of application No. 09/087,476, filed on May 29, 1998, now abandoned.

(51) Int. Cl.[7] ............................................... C02F 1/461
(52) U.S. Cl. ..................... 205/628; 205/629; 205/633; 205/637; 204/257; 204/263; 204/264; 210/763
(58) Field of Search ............................... 205/628, 629, 205/633, 637; 204/257, 263, 264; 210/763

(56) References Cited

U.S. PATENT DOCUMENTS

| | | |
|---|---|---|
| 3,379,634 A | 4/1968 | Rutkowski |
| 3,992,271 A | 11/1976 | Danzig et al. |
| 4,039,409 A | 8/1977 | LaConti et al. |
| 4,040,936 A | 8/1977 | Orth |
| 4,048,383 A | 9/1977 | Clifford |
| 4,136,004 A | 1/1979 | Kamarian et al. |
| 4,191,618 A | 3/1980 | Coker |
| 4,209,368 A | 6/1980 | Coker |
| 4,209,591 A | 6/1980 | Hendriks |
| 4,210,501 A | 7/1980 | Dempsey |
| 4,212,714 A | 7/1980 | Coker et al. |

(List continued on next page.)

FOREIGN PATENT DOCUMENTS

| | | |
|---|---|---|
| WO | WO 99/39840 | 8/1999 |
| WO | WO 99/39841 | 8/1999 |

OTHER PUBLICATIONS

"Prehumidification of Reactants for Flight Weight Hydrogen–Oxygen Fuel Cells", by Arnold P. Fickett et al. for General Electric Company (27 pages) no date.

Abstracts of the 1974 Pittsburgh Conference on Analytical Chemistry and Applied Spectroscopy, No. 4, "A Solid Polymer Electrolyte Hydrogen Gas Generator for Gas Chromatography" by R.C. Jones no month.

"Hydrogen/Oxygen Fuel Cells With In–Situ Product Water Removal", Andrel Leonida, pp. 776–781 no date.

STI, "Status and Applicability of Solid Polymer Electrolyte Technology to Electrolytic Hydrogen and Oxygen Production", W.A. Titterington, pp. 135–136 no date.

American Society of Mechanical Engineers, "Design and Test Status for Life Support Applications of SPE Oxygen Generation Systems", W.A. Titterington and A.C. Erickson, 8 pages no date.

"An Electrochemically Regenerative Hydrogen–Chlorine Energy Storage System for Electric Utilities", E. Gileadi et al., Journal of Power Sources, 2 (1977/78) pp. 191–200 no month.

(List continued on next page.)

*Primary Examiner*—Arun S. Phasge
(74) *Attorney, Agent, or Firm*—Cantor Colburn LLP

(57) ABSTRACT

A fluid management system for use in water electrolysis systems for filtering the system water and recombining hydrogen and oxygen. The fluid management system includes a phase separation tank having a filter containing a catalyzed ion exchange resin. Hydrogen/water mixture and an oxygen/water mixture are introduced into the resin where hydrogen is recombined with oxygen to produce recovered water. Trace contaminant ions and particles are removed from the water by the ion exchange resin and the filter.

28 Claims, 3 Drawing Sheets

U.S. PATENT DOCUMENTS

| | | | |
|---|---|---|---|
| 4,214,958 A | 7/1980 | Coker et al. | |
| 4,224,121 A | 9/1980 | Dempsey et al. | |
| 4,276,146 A | 6/1981 | Coker et al. | |
| 4,294,671 A | 10/1981 | Balko | |
| 4,311,568 A | 1/1982 | Balko | |
| 4,311,569 A | 1/1982 | Dempsey et al. | |
| 4,331,523 A | 5/1982 | Kawasaki | |
| 4,333,805 A | 6/1982 | Davidson et al. | |
| 4,360,416 A | 11/1982 | Davidson et al. | |
| 4,373,391 A | 2/1983 | Johnson | |
| 4,394,244 A | 7/1983 | Divisek et al. | |
| 4,406,752 A | 9/1983 | Weininger et al. | |
| 4,414,092 A | 11/1983 | Lu et al. | |
| 4,444,639 A | 4/1984 | Schurig et al. | |
| 4,457,824 A | 7/1984 | Dempsey | |
| 4,588,661 A | 5/1986 | Kaufman et al. | |
| 4,652,502 A | 3/1987 | Breault et al. | |
| 4,707,229 A | 11/1987 | Dempsey et al. | |
| 4,715,938 A | 12/1987 | Billings | |
| 4,836,929 A | 6/1989 | Baumann et al. | |
| 4,950,371 A | 8/1990 | McElroy | |
| 5,271,813 A | * 12/1993 | Linkous | 205/628 |
| 5,296,109 A | 3/1994 | Carlson et al. | |
| 5,372,689 A | 12/1994 | Carlson et al. | |
| 5,470,448 A | 11/1995 | Molter et al. | |
| 5,480,518 A | 1/1996 | Shane et al. | |
| 5,690,797 A | 11/1997 | Harada et al. | |

OTHER PUBLICATIONS

ASME Publication, Aircraft On–Board Electrochemical Breathing Oxygen Generators, J.W. Harrison, 8 pages Abstracts of Papers, 166th National Meeeting, American Chemical Society Division of Fuel Chemistry, Aug. 27–31, 1973.

Status of Solid Polymer electrolyte Fuel Cell Technology and Potential For Transportation Applications, J.F. McElroy et al, IEEE, 1982, pp. 667–671 no month.

Frontiers of Power Technology, "Prospects for Electrolytic Hydrogen For Chemical/Industrial Plants", L.J. Nuttall, pp. 13-1–13-22 no date.

Alternative Energy Sources, "Feasibility Study of a Regenerative Solid Polymer Electrolyte Fuel Cell System Using Hydrogen/Chlorine Reactants for High Efficiency Energy Storage", L.J. Nuttall et al., pp. 3819–3837 no date.

Proceedings of the 28th Power Sources Symposium, Jun. 12–15, 1978, "An Assessment of the Solid Polymer Electrolyte Fuel Cell for Mobile Power Plants", J.F. McElroy, pp. 32–34.

7th Intersociety Energy Conversion Engineering Conference, 1972, "The Solid Polymer Electrolyte Fuel Cell for the Space Shuttle Orbiter", L. E. Chapman, pp. 466–471 no month.

Abstracts of Papers, First Chemical Congress of the North American Continent, Mexico City, Mexico, Nov. 30–Dec. 5, 1975 (3 pages).

8th Intersocieety Energy Conversion Engineering Conference Proceedings, 1973, Electrolytic Hydrogen Fuel Production With Solid Polymer Electrolyte Technology, W.A. Titterington et al., pp. 574–579 no month.

Journal of the Electrochemical Society, vol. 118, No. 3, Mar. 1971, "Electrochemical Detection of H2, CO, and Hydrocarbons in Inert or Oxygen Atmospheres", A.B. LaConti et al.

Hydrogen Energy System, vol. 1, 1978, "Solid Polymer Electrolyte Water Electrolysis Development Status", L.J. Nuttall, pp. 391–398 no month.

General Electric Company, Report No. 71–C–303, Oct. 1971, "The Current Status of Ion Exchange Memrane Fuel Cells", L.W. Niedrach et al.

SAE Technical Paper Series, 921125, Jul. 1992, "A Low Pressure Electrolyzer for the Next Generation Submarine", A. Leonida et al.

33rd International Power Sources Symposium, Jun. 1988, "Hydrogen/Oxygen Fuel Cells With In–Situ Product Water Removal", A. Leonida, pp. 776–781.

Eight Synthetic Pipeline Gas Symposium, 1976, "Application of Solid Polymer Electrolyte Water Electrolysis for Bulk Hydrogen Generation", L.J. Nuttall, pp. 365–376 no month.

1st World Hydrogen Energy Conference, vol. II, 1976, "Conceptual Design of Large Scale Water Electrolysis Plant Using the Solid Polymer Elecgrolyte Technology", L.J. Nuttall no month.

Journal of the Electrochemical Society, vol. 125, No. 3, Mar. 1978, pp. 74C–76C and p. 166C.

International Energy Agency Annex IV Working Group Advanced Alkaline and Solid Polymer Electrolyte Water Electrolysis, "Field Results and Continuing Development of SPE Electrolyzers", Jul. 1985, D.J. Lizdas et al. (8 pages).

Industrial and Government Applications of SPE Fuel Cell and Electrolyzers, T.G. Coker et al., presented by The Case Western Symposium on "Membranes and Ionic and electronic Conducting Polymer", May 17–19, 1982, (23 pages).

DE82010876, Final Report for the period Oct. 1977–Nov. 1981, General Electric Company, Solid Polymer Electrolyte Water Electrolysis Technology Development for Large–Scale Hydrogen Production, (137 pages).

SPE Hydrogen/Oxygen Fuel Cells for Rigorous Naval Applications, J.F. McElroy et al., United Technologies no date.

SPE Water Electrolysis Subsystem, Configuration and Operations Manual, prepared by Hamilton Standard Division, Electro–Chem Products, Jul. 1991.

Operations and Maintenance Manual for the SIRF—SPE Oxygen Generator Assembly (OGA), Mar. 25, 1993, United Technlogies.

* cited by examiner

FLUIDS MANAGEMENT SYSTEM FOR WATER ELECTROLYSIS

CROSS REFERENCE OF RELATED APPLICATION

This application is a continuation of U.S. patent Ser. No. 09/224,046 filed Dec. 31, 1998, now abandoned which is a continuation-in-part of U.S. patent application Ser. No. 09/087,476, filed May 29, 1998, now abandoned, which are hereby incorporated by reference.

TECHNICAL FIELD

This invention relates generally to water electrolysis systems. In particular, this invention relates to a fluid management system for a water electrolysis system which permits the conservation of water during steady state operation and the generation of high purity hydrogen and oxygen gases.

BACKGROUND OF THE INVENTION

Electrolysis systems are energy conversion systems for producing hydrogen and oxygen gases from water. Typical electrolysis systems include a number of individual cells arranged in a stack with fluid, typically water, forced through the cells at high pressures.

Hydrogen or oxygen gases produced through electrolytic methods often contain: appreciable quantities of atmospheric gases, such as nitrogen, carbon dioxide, and argon due to atmospheric air diffusing into the process water; trace quantities of oxygen and hydrogen, respectively, due to diffusion across the electrolyte membrane; and contaminants, such as iron, sulfur, nickel, chromium, and chlorides, due to leaching from the system components into the water recirculation stream. In systems where these contaminants are not removed, they typically contaminate the electrolyte membrane or catalysts, thereby decreasing the electrolysis cell operation efficiency, and contaminating the product gas stream. Gases produced from the electrolysis cell in this manner must be subsequently purified using expensive filters.

A fluid management system for a typical proton exchange membrane electrolysis system is shown schematically in FIG. 1. A water and hydrogen mixture 60 exits the hydrogen side of electrolysis cell stack 61 and enters high pressure hydrogen/water separator 62. Product hydrogen 63 exits the separator and is directed to further processing (not shown). Hydrogen saturated water 64 passes from high pressure separator 62 to low pressure hydrogen water separator 65 which typically vents low pressure hydrogen gas 66 and collects water 67 in reservoir 68A drains into reservoir 68. Meanwhile, an oxygen/water mixture 69 exits the oxygen side of cell stack 61 and enters a cyclonic style phase separator 70 which vents oxygen gas 71 while collecting water 67 in reservoir 68. Water in reservoir 68 is pumped by pump 72 through deionizer beds 73, 74 and filter vessel 75. After deionizing and filtering, the water reenters the cell stack 61.

What is needed is a fluid management system which provides for contaminant free recirculated water utilizing a minimum amount of equipment, and eliminates the expensive filtering steps of existing fluid management systems.

SUMMARY OF THE INVENTION

The above-described drawbacks and disadvantages of the prior art are alleviated by fluid management system, the separation tank and the method of the present invention.

The phase separation tank comprises: an inlet for introducing water containing dissolved oxygen to the tank, a catalyst bed capable of reacting hydrogen and oxygen to form water and of removing cations and anions from the water; a water permeable filter for containing said catalyst bed, and a second inlet for introducing hydrogen to the catalyst bed.

The present invention method for recovering water in an electrochemical system, comprises: introducing an oxygen and water stream to a catalyzed bed within a tank, introducing a hydrogen dissolved in water stream to an interior area of the catalyzed bed, reacting the hydrogen and oxygen to form water, removing any ionic impurities from the water in the tank; and directing the recycle water to an electrochemical cell.

The above discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE PREFERRED EMBODIMENT

Figure 2:
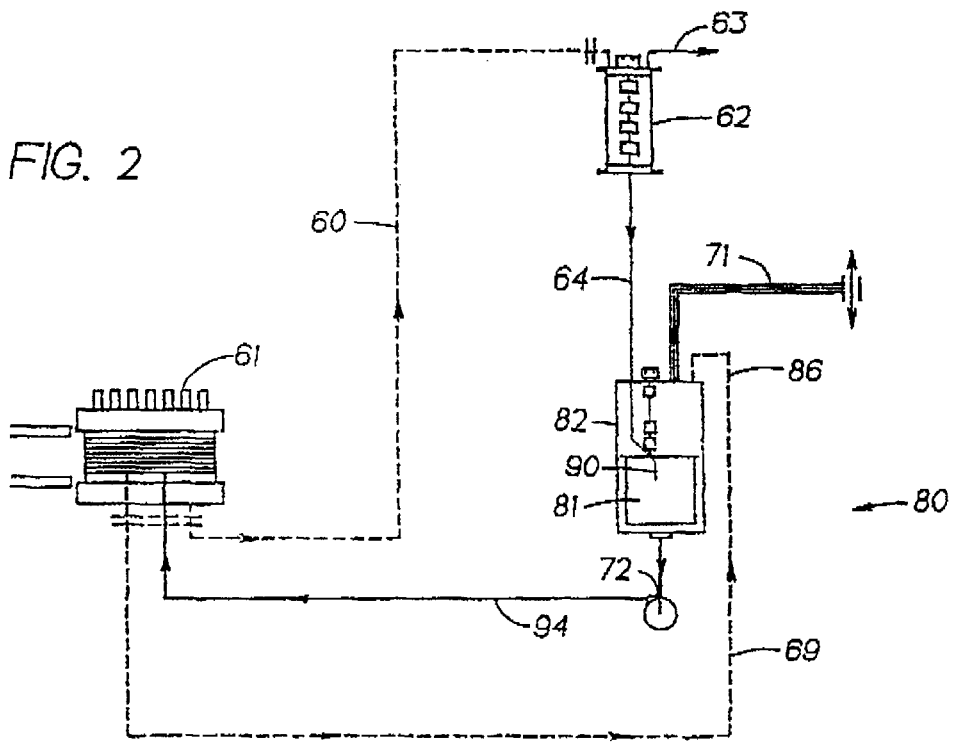
FIG. 2 is a schematic representation of one embodiment of a hydrogen generation system incorporating the fluid management system of the present invention.

Referring to FIG. 2, a fluid management system in accordance with the present invention is shown at 80. Hydrogen and water mixture 60 exits the hydrogen side of electrolysis cell stack 61 and enters high pressure hydrogen/water separator 62. Product hydrogen 63 exits the separator and goes on to further processing (not shown). Hydrogen saturated water 64 flows directly into catalyzed bed 81 of phase separation tank 82. Meanwhile, an oxygen/water mixture 69 exits the oxygen side of cell stack 61 and enters the phase separation tank 82. Oxygen gas 71 exits the system while oxygen saturated water from mixture 69 mixes with hydrogen saturated water mixture 64 in catalyzed bed 81.

Figure 3:
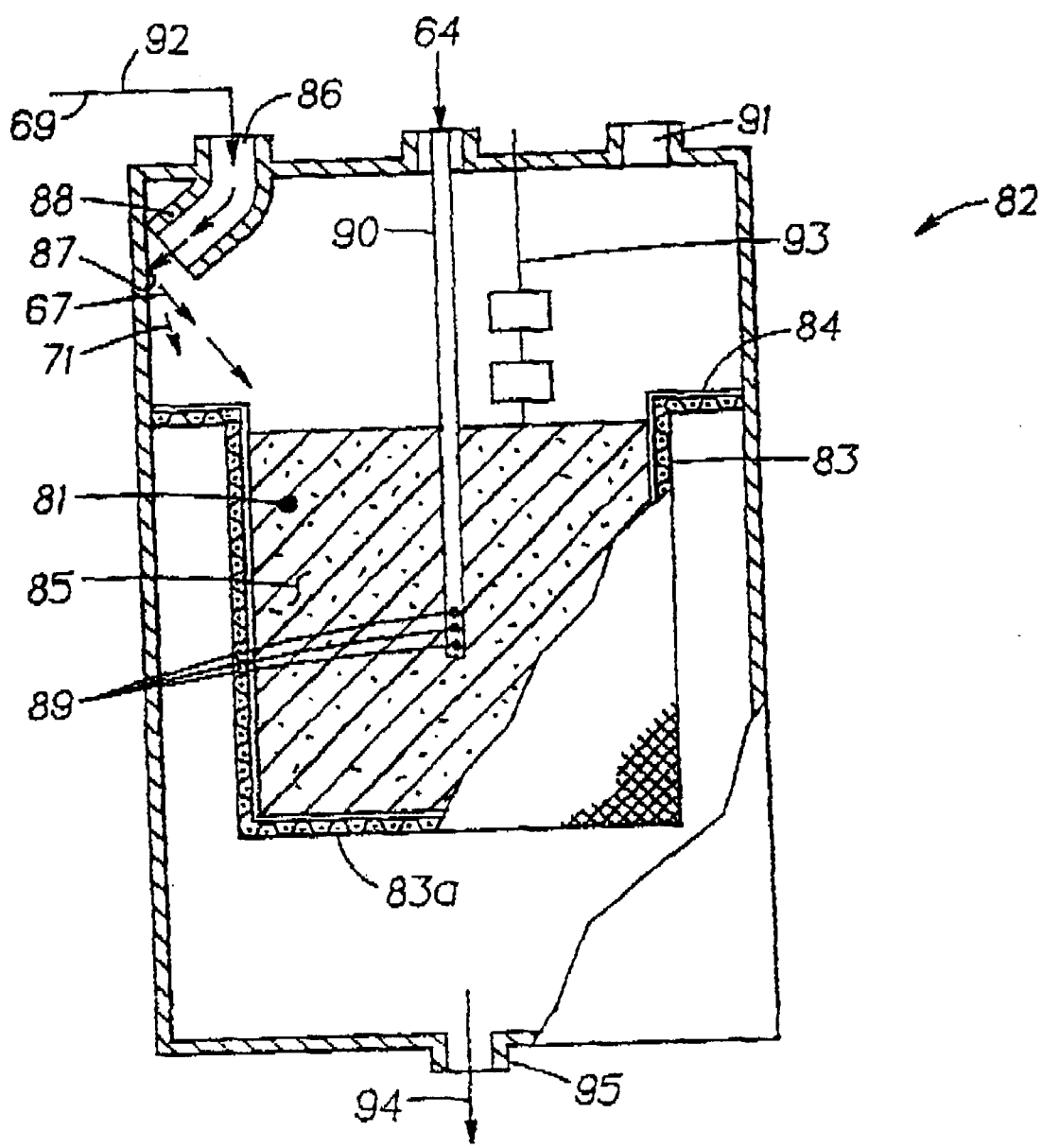
FIG. 3 is a cross sectional view of a phase separation tank of the present invention and a schematic representation of the fluid management system.

Referring to FIG. 3, the phase separation tank 82 comprises: an inlet 86 for accepting an oxygen/water mixture 69 from line 92, an oxygen gas outlet 91, a perforated dip tube 90 for receiving a hydrogen/water mixture 64 and introducing that mixture to catalyzed bed 81 through apertures 89, a filter medium 84 for containing the catalyzed bed 81 and filtering particulates from the water, an optional support member 83 disposed about the filter medium 84 for providing structural integrity thereto, and a water outlet 95.

The tank 82 should have a volume sufficient to process the hydrogen/water mixture and oxygen/water mixture from the electrolysis cell stack under normal operating conditions. For an electrolysis cell stack which produces about 300 scfh of hydrogen, under normal operating conditions, tank 82 will preferably have a volume sufficient to accommodate about 30 seconds of circulation flow, i.e., about 10 to about 20 liters of water, in order to enable sufficient low level detection response time, enabling good process control.

Once introduced to tank 82, hydrogen and oxygen react in catalyst bed 81. Catalyst 85, distributed throughout catalyst bed 81, deionizes water and provides reactive sites for recombination of hydrogen dissolved in mixture 64 with dissolved oxygen contained in mixture 67, to form water. Therefore, the catalyzed bed 81 can contain any material, supported or unsupported, capable of recombining dissolved hydrogen and oxygen to form water and removing anions and cations from the water. Possible materials include ion exchange resins catalyzed with a conventional catalyst including, but not limited to, noble metal base catalysts, such as platinum, palladium, alloys thereof, and others. Preferably, the material is an ion exchange resin-platinum mixture having a high catalyst surface area (about 4 square meters per cubic meter, or greater).

The catalyst bed 81 is supported in a filter medium 84, which may be supported by a support member 83. The filter medium 84 can be any filtering source capable of sufficiently removing particulates in the water such that, when recirculated to the electrochemical cell stack, the water will not contaminate the electrochemical cells. Possible filter media include, but are not limited to, woven and non-woven fabrics, such as polypropylene non-woven material, or tetrafluoroethylene non-woven material, among others compatible with the tank environment and contents. The filter medium should be capable of removing particulates having a diameter of about 10 microns or greater, with a medium capable of removing particulates having a diameter of about 5 microns or greater, preferred.

The support member 83, which provides structural integrity to the filter medium 84, can be any water permeable medium having sufficient mechanical strength to support the filter medium and contain the catalyst 85, while contributing minimal pressure drop to the system. Possible support members include, but are not limited to, perforated metal, ceramic, and/or plastic structures, such as screens and perforated plates, having an about 60% to about 90% open area, with openings of about 0.125 inches to about 0.25 preferred. It is additionally preferred to use a support member 83 which is porous on all sides due to reduce mass flow issues associated with filtering the water and directing the water to outlet 95.

In order to prevent hydrogen gas from directly mixing with oxygen gas in tank 82 above the catalyst bed 81, the hydrogen is preferably introduced to the tank beneath the catalyst surface. For example, tube 90, which extends through tank 82, into catalyst bed 81, introduces the hydrogen/water mixture 64 to the catalyst bed 81, subsurface. This tube 90 can be any means for introducing the hydrogen/water mixture to the catalyzed bed such that the hydrogen becomes substantially evenly distributed throughout the bed such as a perforated dip tube or similar structure, or a porous sheet with at least one internal channel for distributing the hydrogen/water mixture throughout the sheet, or another means. Note, it is feasible that small amounts of hydrogen gas could alternatively be introduced to the catalyst bed through the bottom of tank 82 such that the gas filters up through the catalyst bed 81 to react with the dissolved oxygen.

Another technique for inhibiting direct hydrogen gas and oxygen gas mixing is to maintain sufficient water within the tank 82. Maintaining the water level additionally prevents catalyst dryout and replenishes water electrolyzed in the cell stack 61. The desired water level is maintained using level sensor 93 which is any conventional device for monitoring liquid levels which is compatible with the tank environment. Possible sensors include, but are not limited to, electrical sensors and mechanical devices. For example, the level sensor 93 operably connects to a valve (not shown) to regulate the flow of make-up water 92 into tank 82. The level sensor 93 monitors the combined oxygen/water mixture 69 and hydrogen/water mixture 64 level within tank 82 and enables the flow of sufficient make-up water 92 from an external source to maintain a sufficient water level to submerge the catalyzed bed and to replace water that has been electrolyzed. The make-up water 92 can be introduced to tank 82 in combination with the oxygen/water mixture 69, the hydrogen/water mixture 64, or directly.

During operation the oxygen/water mixture 69 is preferably introduced to tank 82 by directing the mixture against the wall 87 or an interior baffle (not shown) by any conventional means, including connecting line 92 to the tank 82 at an angle using a diverter 88, or other means, or disposing a baffle within tank 82 within the oxygen/water mixture 69 flow stream. For example, oxygen/water mixture 69, including make-up water, preferably enters tank 82 through inlet 86 at an angle sufficient to cause the mixture 69 to impinge against wall 87. The impingement of mixture 69 against wall 87 or an extension baffle causes increased agitation of the mixture, resulting in the release of entrained gaseous oxygen 71 from the mixture. Released oxygen gas 71 exits tank 82 through outlet 91. Water containing dissolved oxygen 67, then enters catalyzed bed 81, while hydrogen/water mixture 64 enters catalyzed bed 81 through apertures 89 in dip tube 90. Within the catalyzed bed 81, the dissolved hydrogen and oxygen recombine to form water, and any cationic and anionic impurities are removed by the ion exchange resin. The recovered, combined water exits the catalyzed bed 81 through filter medium 84 and support member 83, and exits the tank 82 through outlet 95. Recovered, combined water 94 is then routed from outlet 95 to pump 72 and reintroduced to electrolysis cell stack 61.

Figure 4:
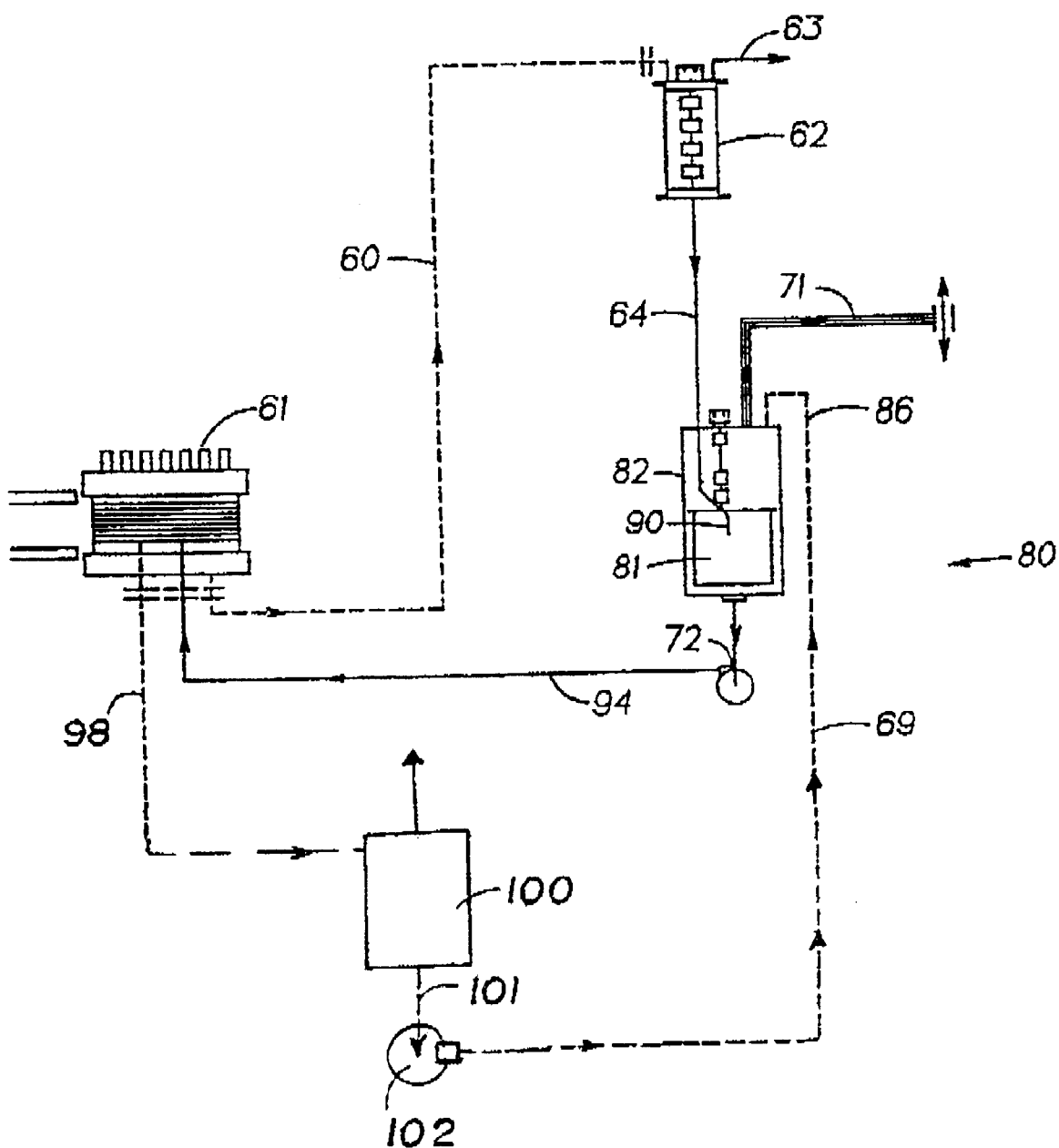
FIG. 4 is a schematic representation of another embodiment of a hydrogen generation system incorporating the fluid management system of the present invention.

It is preferred to operate the present system under a positive pressure. Referring to FIG. 4, the oxygen/water stream 98 exits the cell stack 61 and can be introduced to a phase separation tank 100. The oxygen saturated stream 101 is drawn from the phase separation tank 100 by pump 102 which pressurizes the stream and pumps pressurized oxygen saturated stream 69' to tank 82.

The pressure employed within the catalyzed bed can be up to the tolerances of the cell stack, with a pressure of up to the operating pressure of the cell stack (up to or exceeding about 2,500 psi) preferred, and a pressure sufficient to enhance the reaction within the catalyzed bed up to the operating pressure more preferred. Typically, the positive pressure can be about 20 psi to about 3,500 psi, with about 25 psi to about 2,000 psi preferred for most electrochemical cell stacks.

A pressure of about 25 psi to about 450 psi especially preferred for an electrolysis cell stack having a 10 scfh hydrogen production rate. Similar 9 or higher pressures may be used for cell stacks having higher production rates such as up to or exceeding about 1,000 scfh, or even about 10,000 scfh or greater. It is believed that the pressure induced by the pump used to introduce the hydrogen containing water stream into the catalyzed bed may be sufficient to enhance the reaction within the catalyzed bed.

Figure 1:
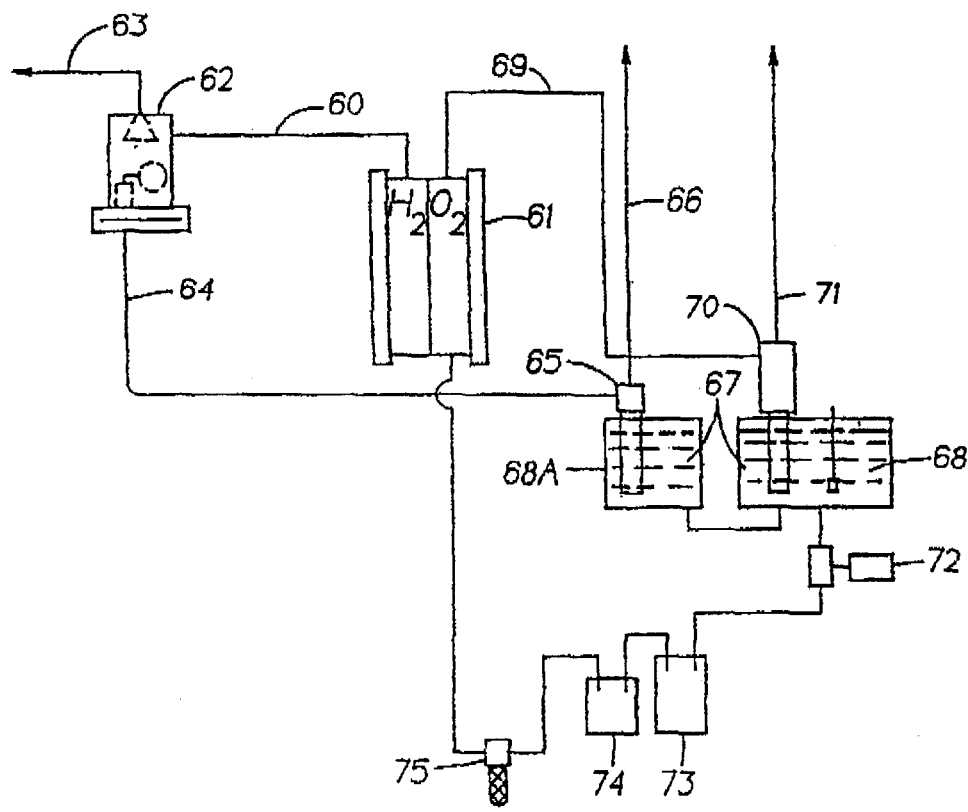
FIG. 1 is a schematic representation of a hydrogen generator system of the prior art.

The electrolysis cell fluid management system of the present invention provides an improved method and apparatus over conventional systems in areas including hydrogen recovery from hydrogen/water mixture, oxygen/water separation, and polishing, deionizing and filtering circulation water. For example, in comparison to the prior art system of FIG. 1, the present system utilizes low pressure hydrogen 66 and replaces the low pressure hydrogen separator 65, the reservoir 68A, the cyclonic separator 70 deionizers 73, 74, and filter vessel 75, with tank 82. In the present system the hydrogen recombines with dissolved oxygen in catalyzed bed 81 to form water which combines with water introduced with the dissolved oxygen and any make-up water, and the combined water is deionized and filtered to form recovered water 94 which exits tank 82 through outlet 95.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A fluid management system for recycling water within an electrochemical cell system, comprising:
    an electrochemical cell stack;
    a phase separation tank, comprising:
        an oxygen inlet capable of receiving an oxygen/water stream from said electrochemical cell stack;
        a filter medium disposed within said tank for receiving the oxygen/water stream;
        a catalyzed bed disposed within said filter medium such that said catalyzed bed is capable of receiving the oxygen/water stream, said catalyzed bed having catalyst capable of reacting oxygen and hydrogen to form water and; and
        a second inlet for introducing hydrogen disposed from an external point of said tank to a subsurface portion of said catalyst; and
    a conduit connected to said tank for directing water from said tank to said electrochemical cell.

2. A fluid management system as in claim 1, wherein said phase separation tank further comprises an oxygen gas release disposed near said oxygen inlet.

3. A fluid management system as in claim 2, wherein said oxygen gas release is a stream diverter which diverts said oxygen/water stream toward a wall of said tank or a baffle disposed to intersect said oxygen/water stream.

4. A fluid management system as in claim 1, wherein said catalyst is catalyzed ion exchange resin.

5. A fluid management system as in claim 4, wherein said catalyst is a noble metal based catalyst or alloy thereof.

6. A fluid management system as in claim 4, wherein said catalyst is platinum or an alloy thereof.

7. A fluid management system as in claim 1, wherein said filter medium is a woven or non-woven fabric capable of removing particulates having a diameter of about 5 microns or greater from the water.

8. A fluid management system as in claim 1, further comprising a support member disposed about and providing structural integrity to said filter medium.

9. A fluid management system as in claim 1, wherein said hydrogen inlet is a conduit having an end disposed below the catalyst surface, said end having perforations such that hydrogen flows through said conduit into said catalyst.

10. A fluid management system as in claim 1, further comprising a level sensor capable of monitoring the level of water within said tank.

11. A unique phase separation tank, comprising:
    an oxygen inlet capable of receiving an oxygen/water stream;
    a filter medium disposed within said tank for receiving the oxygen/water stream;
    a catalyzed bed disposed within said filter medium such that said catalyzed bed is capable of receiving the oxygen/water stream, said catalyzed bed having catalyst capable of reacting oxygen and hydrogen to form water; and
    a second inlet for introducing hydrogen disposed from an external point of said tank to a sub-surface portion of said catalyst.

12. A unique phase separation tank as in claim 11, wherein said phase separation tank further comprises an oxygen gas release disposed near said oxygen inlet.

13. A unique phase separation tank as in claim 12, wherein said oxygen gas release is a stream diverter which diverts said oxygen/water stream toward a wall of said tank or a baffle disposed to intersect said oxygen/water stream.

14. A unique phase separation tank as in claim 11, wherein said catalyst is catalyzed ion exchange resin.

15. A unique phase separation tank as in claim 14, wherein said catalyst is a noble metal based catalyst or alloy thereof.

16. A unique phase separation tank as in claim 14, wherein said catalyst is platinum or an alloy thereof.

17. A unique phase separation tank as in claim 11, wherein said filter medium is a woven or non-woven fabric capable of removing particulates having a diameter of about 5 microns or greater from the water.

18. A unique phase separation tank as in claim 11, further comprising a support member disposed about and providing structural integrity to said filter medium.

19. A unique phase separation tank as in claim 11, wherein said hydrogen inlet is a conduit having an end disposed below the catalyst surface, said end having perforations such that hydrogen flows through said conduit into said catalyst.

20. A unique phase separation tank as in claim 11, further comprising a level sensor capable of monitoring the level of water within said tank.

21. A method for recovering water in an electrochemical cell system, said electrochemical cell system having an operating pressure, comprising:
    introducing a first stream having oxygen and water to a catalyzed bed within a tank;
    introducing a second stream having hydrogen dissolved in water to an interior area of said catalyzed bed, wherein said catalyzed bed is disposed within a filter;
    reacting the hydrogen and oxygen to form water, wherein the formed water and the water from the first stream and the second stream combine to form recycle water; and
    directing the recycle water to an electrochemical cell.

22. A method for recovering water as in claim 21, further comprising removing oxygen gas from the tank.

23. A method for recovering water as in claim 21, further comprising maintaining said catalyzed bed at a positive pressure.

24. A method for recovering water as in claim 23, wherein said positive pressure is up to the operating pressure.

25. A method for recovering water as in claim 24, wherein said positive pressure is a pressure which will enhance the reaction between the hydrogen and oxygen up to the operating pressure.

26. A method for recovering water as in claim 23, wherein said positive pressure is 20 psi to 3,500 psi.

27. A method for recovering water as in claim 26, wherein said positive pressure is 25 psi to 2,000 psi.

28. A method for recovering water as in claim 27, wherein said positive pressure is 25 psi to 450 psi.

* * * * *